(12) United States Patent
Nozaki et al.

(10) Patent No.: US 7,641,017 B2
(45) Date of Patent: Jan. 5, 2010

(54) FUEL CELL VEHICLE

(75) Inventors: Shujiro Nozaki, Utsunomiya (JP);
Takashi Kato, Shioya-gun (JP); Makoto Anazawa, Utsunomiya (JP); Masato Nakaarai, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 679 days.

(21) Appl. No.: 11/421,248

(22) Filed: May 31, 2006

(65) Prior Publication Data

US 2006/0272877 A1 Dec. 7, 2006

(30) Foreign Application Priority Data

| Jun. 2, 2005 | (JP) | ............................. 2005-162393 |
| Jun. 2, 2005 | (JP) | ............................. 2005-162395 |
| Jun. 2, 2005 | (JP) | ............................. 2005-162396 |

(51) Int. Cl.
*B60K 1/04* (2006.01)
(52) U.S. Cl. .................................. 180/291; 180/65.22
(58) Field of Classification Search ................. 180/65.1, 180/65.31, 291, 295, 299, 311, 312; 296/193.07, 296/187.08, 204
See application file for complete search history.

(56) References Cited

U.S. PATENT DOCUMENTS

| 5,193,635 | A | * | 3/1993 | Mizuno et al. | ............ | 180/65.25 |
| 5,392,873 | A | * | 2/1995 | Masuyama et al. | .......... | 180/68.5 |
| 5,443,578 | A | * | 8/1995 | Davis, Jr. | ..................... | 280/834 |
| 5,501,289 | A | * | 3/1996 | Nishikawa et al. | .......... | 180/68.5 |
| 5,534,364 | A | * | 7/1996 | Watanabe et al. | ............. | 429/61 |
| 5,641,031 | A | * | 6/1997 | Riemer et al. | ................. | 429/13 |
| 5,673,939 | A | * | 10/1997 | Bees et al. | ................... | 280/831 |
| 5,702,125 | A | * | 12/1997 | Nakajima et al. | ........... | 280/834 |
| 6,188,574 | B1 | * | 2/2001 | Anazawa | ..................... | 361/695 |
| 6,220,380 | B1 | * | 4/2001 | Mita et al. | ................. | 180/65.1 |
| 6,378,637 | B1 | * | 4/2002 | Ono et al. | ................ | 180/65.31 |
| 6,598,691 | B2 | * | 7/2003 | Mita et al. | ................. | 180/65.1 |
| 6,676,163 | B2 | * | 1/2004 | Joitescu et al. | ............. | 280/834 |
| 6,824,168 | B2 | * | 11/2004 | Kawazu et al. | ............. | 280/834 |
| 6,874,588 | B2 | * | 4/2005 | Kato et al. | ..................... | 429/13 |
| 6,953,099 | B2 | * | 10/2005 | Kawasaki et al. | .......... | 180/65.1 |
| 6,974,156 | B2 | * | 12/2005 | Kosuge et al. | ............. | 280/831 |
| 6,983,945 | B2 | * | 1/2006 | Kawasaki et al. | ........... | 280/834 |
| 6,994,178 | B2 | * | 2/2006 | Mizuno | ....................... | 429/13 |
| 7,040,432 | B2 | * | 5/2006 | Kawasaki et al. | .......... | 180/65.1 |
| 7,048,321 | B2 | * | 5/2006 | Bandoh et al. | ............. | 296/37.8 |
| 7,063,355 | B2 | * | 6/2006 | Hashimura | .................. | 280/830 |
| 7,073,824 | B2 | * | 7/2006 | Uhara et al. | ................. | 280/834 |

(Continued)

FOREIGN PATENT DOCUMENTS

JP 2003-182624 7/2003

*Primary Examiner*—Glenn Dayoan
*Assistant Examiner*—Vaughn T Coolman
(74) *Attorney, Agent, or Firm*—Rankin, Hill & Clark LLP

(57) ABSTRACT

A fuel cell vehicle includes a vehicle body having a floor frame; a fuel cell that generates electricity by the electrochemical reaction of hydrogen and oxygen; and a subframe on which the fuel cell is mounted, being attached to the lower side of the floor frame and has a pair of side frames that extend in the fore-aft direction of the vehicle body, wherein the bottom end of the fuel cell disposed at a position between the upper end and the lower end of the subframe.

8 Claims, 12 Drawing Sheets

U.S. PATENT DOCUMENTS

| | | | |
|---|---|---|---|
| 7,108,091 B2* | 9/2006 | Guidry et al. | 180/68.1 |
| 7,137,466 B2* | 11/2006 | Kawasaki et al. | 429/13 |
| 7,137,474 B2* | 11/2006 | Yokote | 180/314 |
| 7,195,282 B2* | 3/2007 | Mizuno | 280/830 |
| 7,219,758 B2* | 5/2007 | Guidry et al. | 180/65.31 |
| 7,264,277 B2* | 9/2007 | Ono et al. | 280/830 |
| 7,270,209 B2* | 9/2007 | Suess | 180/69.5 |
| 7,533,748 B2* | 5/2009 | Miyajima et al. | 180/68.5 |
| 2003/0012998 A1* | 1/2003 | Bruck et al. | 429/34 |
| 2003/0047932 A1* | 3/2003 | Kawazu et al. | 280/830 |
| 2003/0189334 A1* | 10/2003 | Kawasaki et al. | 280/834 |
| 2004/0020696 A1* | 2/2004 | Kawasaki et al. | 180/65.1 |
| 2004/0062955 A1* | 4/2004 | Kubota et al. | 429/9 |
| 2004/0094340 A1* | 5/2004 | Kawasaki et al. | 180/65.1 |
| 2004/0101725 A1* | 5/2004 | Kato et al. | 429/24 |
| 2004/0101745 A1* | 5/2004 | Kawasaki et al. | 429/96 |
| 2005/0158606 A1* | 7/2005 | Xia et al. | 429/34 |
| 2005/0161935 A1* | 7/2005 | Ono et al. | 280/834 |
| 2005/0173170 A1* | 8/2005 | Miyajima et al. | 180/68.5 |
| 2005/0211496 A1* | 9/2005 | Ito et al. | 180/314 |
| 2006/0102398 A1* | 5/2006 | Mizuno | 180/65.3 |

* cited by examiner ized on Japanese Patent Applications No.
FUEL CELL VEHICLE

BACKGROUND OF THE INVENTION

1. Field of the Invention

The present invention relates to a fuel cell vehicle equipped with an electric motor powered by a fuel cell.

Priority is claimed on Japanese Patent Applications No. 2005-162393, No. 2005-162395, and No. 2005-162396 filed Jun. 2, 2005, the content of which is incorporated herein by reference.

2. Description of Related Art

There is known a fuel cell mounting structure for a fuel cell vehicle that provides a subframe on which are mounted the fuel cell and auxiliary components thereof, with the subframe being fastened to vehicle body frame members from below to be disposed under the vehicle floor. (see, for example, Japanese Unexamined Patent Application, First Publication No. 2003-182624.)

When mounting a fuel cell and the like on such a subframe to be disposed under the vehicle floor, care must be taken so that obstructions on the road do not interfere with the fuel cell.

Mechanical strength is required to the subframe for supporting the equipment mounted on the subframe while transmitting the weight to the vehicle body frame members. On the other hand, a lightweight subframe with a thin profile is sought to meet demands for reducing the vehicle weight. Simultaneously meeting both requirements has thus proven to be difficult.

Disposing the fuel cell and related components under the vehicle floor has also given rise to the issue of lowering the height of the vehicle floor. That is, since the fuel cell has conventionally been mounted on top of the subframe, mounting of the subframe has required that the height measurement from the bottom edge of the subframe to the vehicle floor be at least equal to the dimensions of the subframe in the height direction and the height dimension of the fuel cell. This has therefore posed a hurdle to lowering the height of the floor.

SUMMARY OF THE INVENTION

An object of the present invention is to provide a fuel cell vehicle that can protect the fuel cell and related equipment from obstructions under the vehicle floor with a lightweight and simple structure.

Another object of the present invention is to provide a fuel cell vehicle provided with a subframe that ensures mechanical strength while being lightweight. Still another object of the present invention is to provide a fuel cell vehicle that allows for a lowering of the vehicle floor.

A first aspect of the present invention is a fuel cell vehicle including a vehicle body having a floor frame; a fuel cell that generates electricity by the electrochemical reaction of hydrogen and oxygen; and a subframe on which the fuel cell is mounted, being attached to the lower side of the floor frame and has a pair of side frames that extend in the fore-aft direction of the vehicle body, wherein the bottom end of the fuel cell disposed at a position between the upper end and the lower end of the subframe.

The fuel cell vehicle may further include a plurality of cross-members that extend in the width direction of the vehicle body to couple the side frames, wherein the fuel cell is disposed at a position between a mutually adjacent pair of the cross-members, with the bottom end of the fuel cell disposed at a position between the upper end and the lower end of the cross-members, and the front end portion and rear end portion of the fuel cell being fastened to those cross-members.

The fuel cell vehicle may further include an L-shape member which couples the fuel cell and the cross-members.

A second aspect of the present invention is a fuel cell vehicle including a vehicle body having a floor frame; front wheels; rear wheels; a fuel cell that generates electricity by the electrochemical reaction of hydrogen and oxygen; and a subframe on which the fuel cell is mounted, being attached to the lower side of the floor frame and has a pair of side frames that extend in the fore-aft direction of the vehicle body; wherein the lower end of each side frame is formed to have a recess portion so that the portion located substantially midway between the front wheels and the rear wheels is the highest point from the tire-ground contact surface.

The fuel cell vehicle may further include a plurality of cross-members that extend in the width direction of the vehicle body to couple the side frames, wherein each of the side frames has an upper side frame and a lower side frame, with the upper side frame and the lower side frame sandwiching and fixing the end portions of the cross-members.

The upper side frames, the lower side frames, and the end portions of the cross-members may be fastened to the floor frame by a common bolt.

The fuel cell vehicle may further include a plurality of cross-members that extend in the width direction of the vehicle body to couple the side frames and an underguard that is provided in front of the subframe and has a shape that slopes downward toward the rear of the vehicle body, wherein the vehicle body has a vehicle-body frame that extends in the width direction, and wherein the front edge of the underguard is coupled to the vehicle-body frame, and the rear edge of the underguard is coupled to the cross-member disposed closest to the front of the vehicle body.

The fuel cell vehicle may further include a second subframe attached to the lower side of the floor frame, separate from the subframe in the fore-aft direction of the vehicle body and a coupling member that couples mutually approaching portions of the subframe and the second subframe.

The fuel cell vehicle may further include a hydrogen tank which stores pressurized hydrogen to be supplied to the fuel cell, being mounted on the second subframe.

The fuel cell vehicle may further include a motor which drives at least one of the front wheels and rear wheels, being mounted on the second subframe.

The fuel cell vehicle may further include a plurality of cross-members that extend in the width direction of the vehicle body to couple the side frames, wherein the coupling member is coupled to one of the cross-members disposed at a position closest to the second subframe.

A third aspect of the present invention is a fuel cell vehicle including a vehicle body having a vehicle-body frame that extends in the width direction and a floor frame that extend in the fore-aft direction; a fuel cell that generates electricity by the electrochemical reaction of hydrogen and oxygen; a subframe on which the fuel cell is mounted, being attached to the lower side of the floor frame and has a pair of side frames that extend in the fore-aft direction of the vehicle body; a plurality of cross-members that extend in the width direction of the vehicle body to couple the side frames; and an underguard that is provided in front of the subframe and has a shape that slopes downward toward the rear of the vehicle body, wherein the front edge of the underguard is coupled to the vehicle-body frame, and the rear edge of the underguard is coupled to the cross-member disposed closest to the front of the vehicle body.

A fourth aspect of the present invention is a fuel cell vehicle including a vehicle body having a floor frame; a fuel cell that generates electricity by the electrochemical reaction of hydrogen and oxygen; a first subframe on which the fuel cell is mounted, being attached to the lower side of the floor frame and has a pair of side frames that extend in the fore-aft direction of the vehicle body; and a second subframe which is attached to the lower side of the floor frame, being coupled to one of the ends of the first subframe in the fore-aft direction of the vehicle body.

The fuel cell vehicle may further include a coupling member that couples mutually approaching portions of the first subframe and the second subframe.

The fuel cell vehicle may further include a hydrogen tank which stores pressurized hydrogen to be supplied to the fuel cell, being mounted on the second subframe.

The fuel cell vehicle may further include a motor which drives at least one of the front wheels and rear wheels, being mounted on the second subframe.

DETAILED DESCRIPTION OF THE INVENTION

Figure 1:
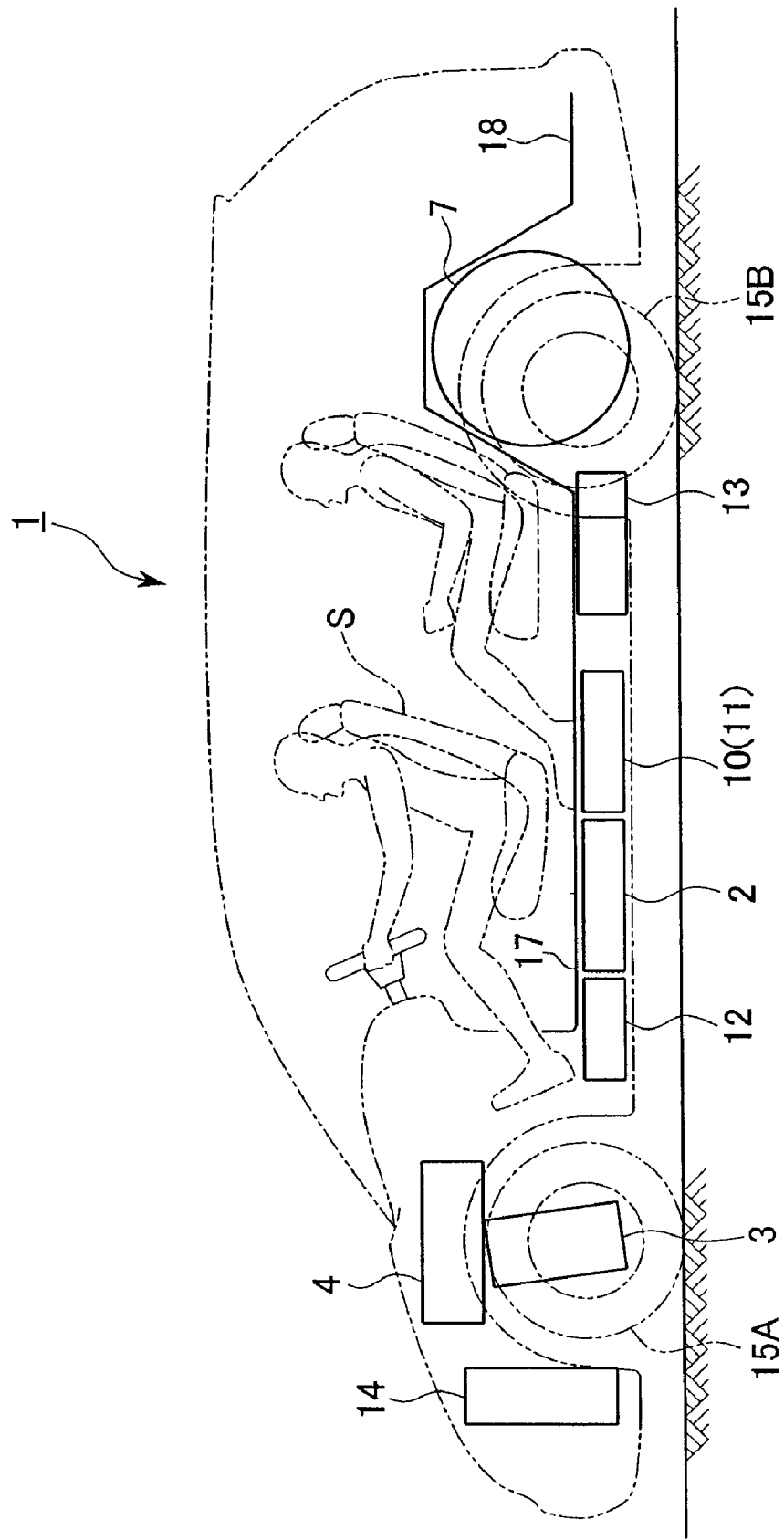
FIG. 1 is a layout drawing of the fuel cell vehicle according to the present invention viewed from one side.

An embodiment of the fuel cell vehicle according to the present invention shall be explained hereinbelow with reference to FIGS. 1 to 14. In the drawings, the arrows pointing in the front, rear, left, and right directions refer to the front, rear, left, and right of the vehicle body, respectively.

Figure 2:
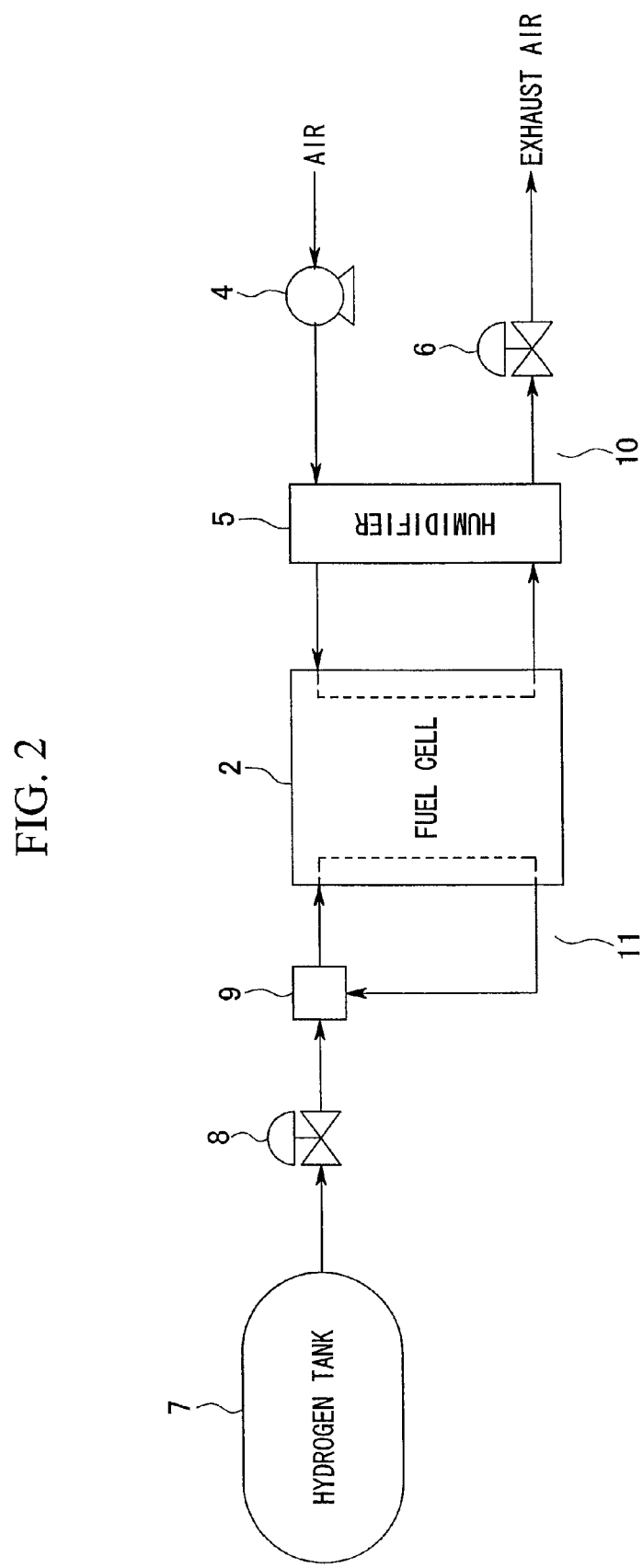
FIG. 2 is an outline lineblock diagram of a fuel cell system mounted in the fuel cell vehicle.

As shown in FIG. 1, a fuel cell vehicle 1 is one equipped with a fuel cell 2 that generates electricity by the electrochemical reaction of hydrogen and oxygen, and travels by driving a drive motor 3 with electric power produced by this generation FIG. 2 shows an outline of the fuel cell system. As shown in FIG. 2, air including oxygen that is compressed by a compressor 4 is humidified with a humidifier 5 and then supplied to the cathode of the fuel cell 2. After electricity generation, it is discharged from the fuel cell 2 and, after circulating through the humidifier 5 as a humidity source, is discharged through a pressure control valve 6. On the other side, hydrogen gas from a hydrogen tank 7 is decompressed by a regulator 8 and supplied to the anode of the fuel cell 2 via an ejector 9. Excess hydrogen gas is discharged from the fuel cell 2 and suctioned into the ejector 9, where it is mixed with fresh hydrogen from the hydrogen tank 7 to be supplied again to the fuel cell 2. In the following description, equipment such as the humidifier 5 and the pressure control valve 6 that are related to the feeding and discharging of air are referred to collectively as an air supply-discharge device 10, while equipment such as the regulator 8 and the ejector 9 related to the supply of hydrogen are referred to collectively as a hydrogen circulation device 11.

As shown in FIG. 1, the drive motor 3 and the compressor 4 are mounted on a motor subframe 16 (refer to FIG. 3), to be installed near front tires 15A. Two of the fuel cells 2 connected in series, a plurality of high-voltage electrical devices 12 that control the fuel cells 2, the air supply-discharge device 10 and the hydrogen circulation device 11 are mounted on a fuel cell subframe 30 (refer to FIG. 3), to be installed in the underfloor area under a front floor 17 located under a front seat S. The hydrogen tank 7 is mounted with a capacitor 13 on a hydrogen tank subframe 90 (refer to FIG. 3), to be installed in the underfloor area below a rear floor 18 at the rear of the vehicle body. The capacitor 13 stores regenerative power from the drive motor 3 at the time of deceleration of the fuel cell vehicle 1. The reference number 14 in FIG. 1 indicates a radiator for cooling the cooling water that circulates through the fuel cells 2.

Figure 4:
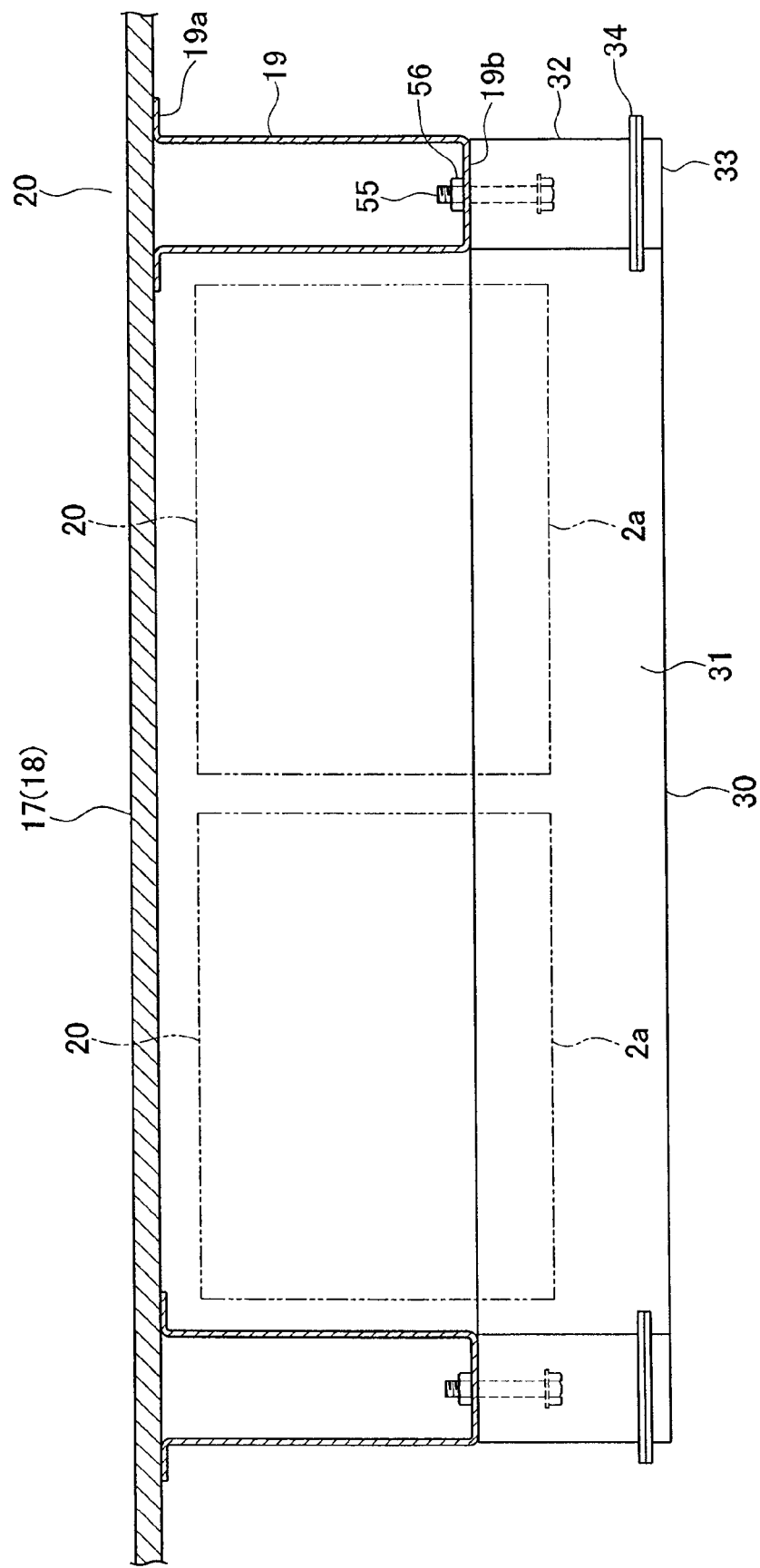
FIG. 4 is a drawing of the fuel cell vehicle showing the state of the fuel cell subframe mounted on the vehicle body, viewed from the rear of the vehicle.

As shown in FIG. 4, floor frames 19 that extend in the fore-aft direction of the vehicle body and have a hat-shaped cross section are joined by a flange portion 19a to both sides of the bottom surface of the front floor 17 and the rear floor 18. A vehicle body frame portion 20 is thereby formed in the fore-aft direction of the vehicle body by the floor frames 19, the front floor 17, and the rear floor 18. The fuel cell subframe 30 is fastened to a lower wall 19b of each floor frame 19 from the lower side thereof by a bolt 55 and a nut 56. Similarly, although not illustrated, the hydrogen tank subframe 90 is fastened by a bolt and a nut to the lower wall 19b of each floor frame 19 from the lower side thereof. The fuel cell subframe 30 and the hydrogen tank subframe 90 are disposed to be slightly separated in the fore-aft direction of the vehicle body.

Figure 5:
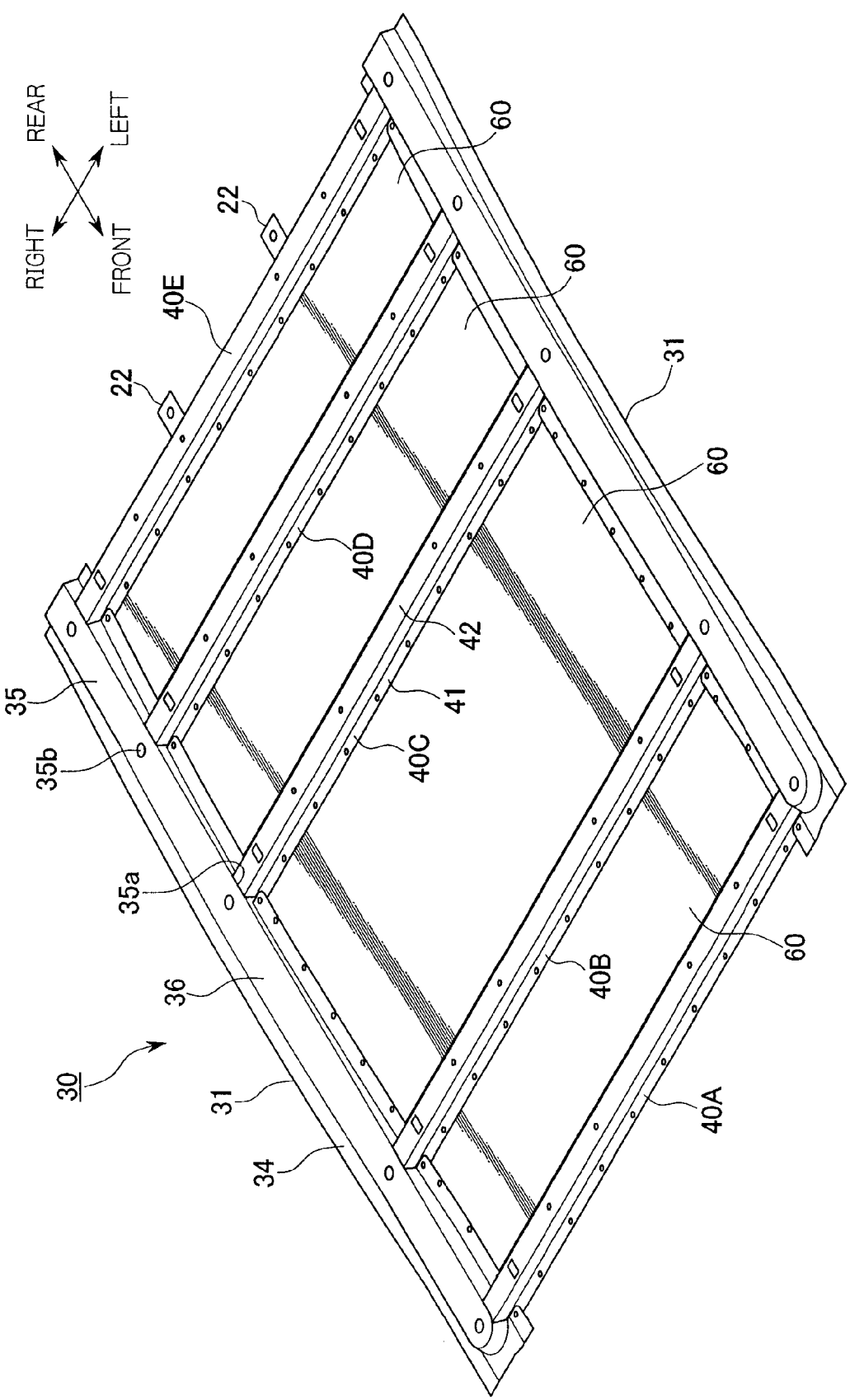
FIG. 5 is an exterior perspective view of the fuel cell subframe.
Figure 6:
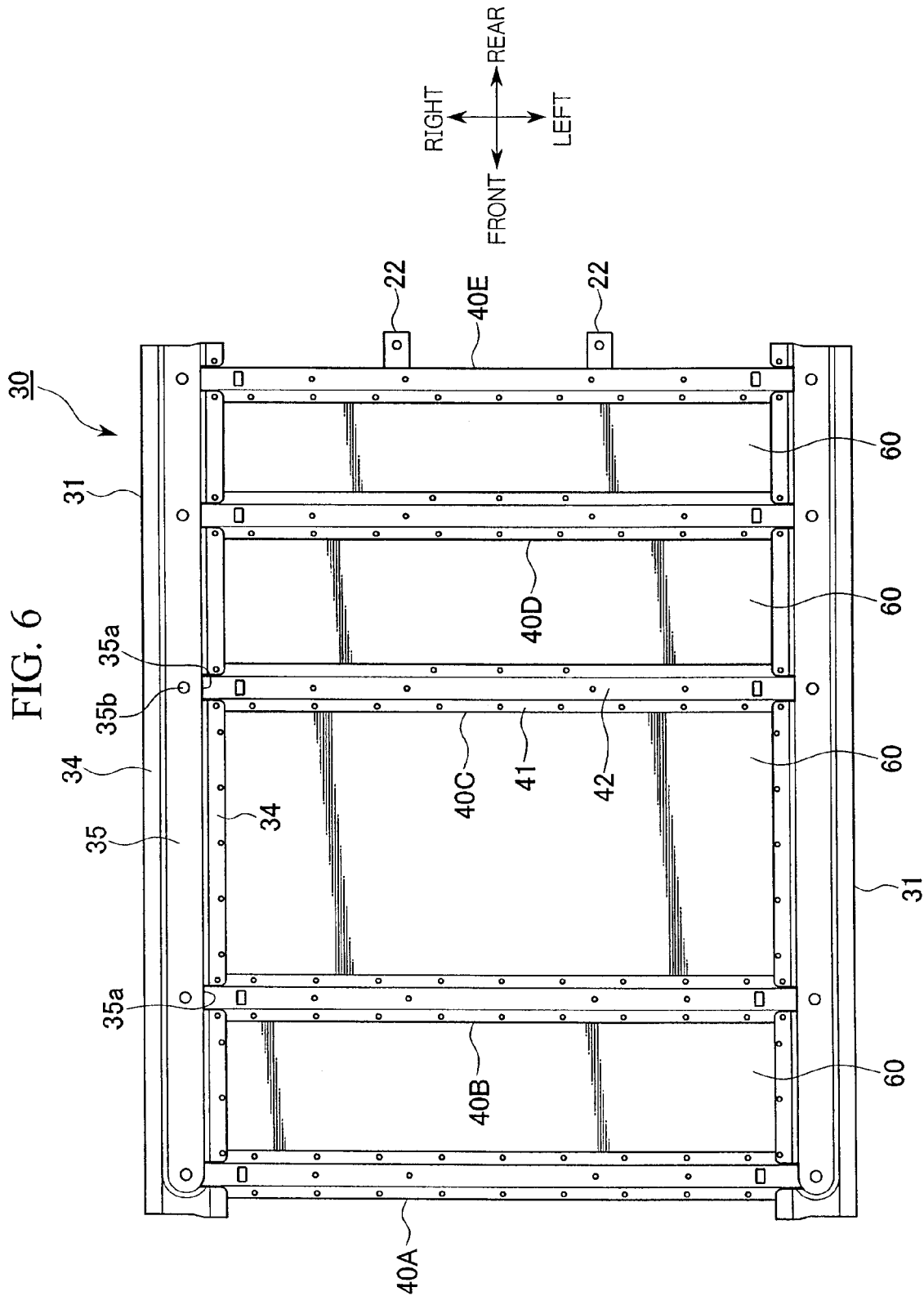
FIG. 6 is a plan view of the fuel cell subframe.
Figure 7:
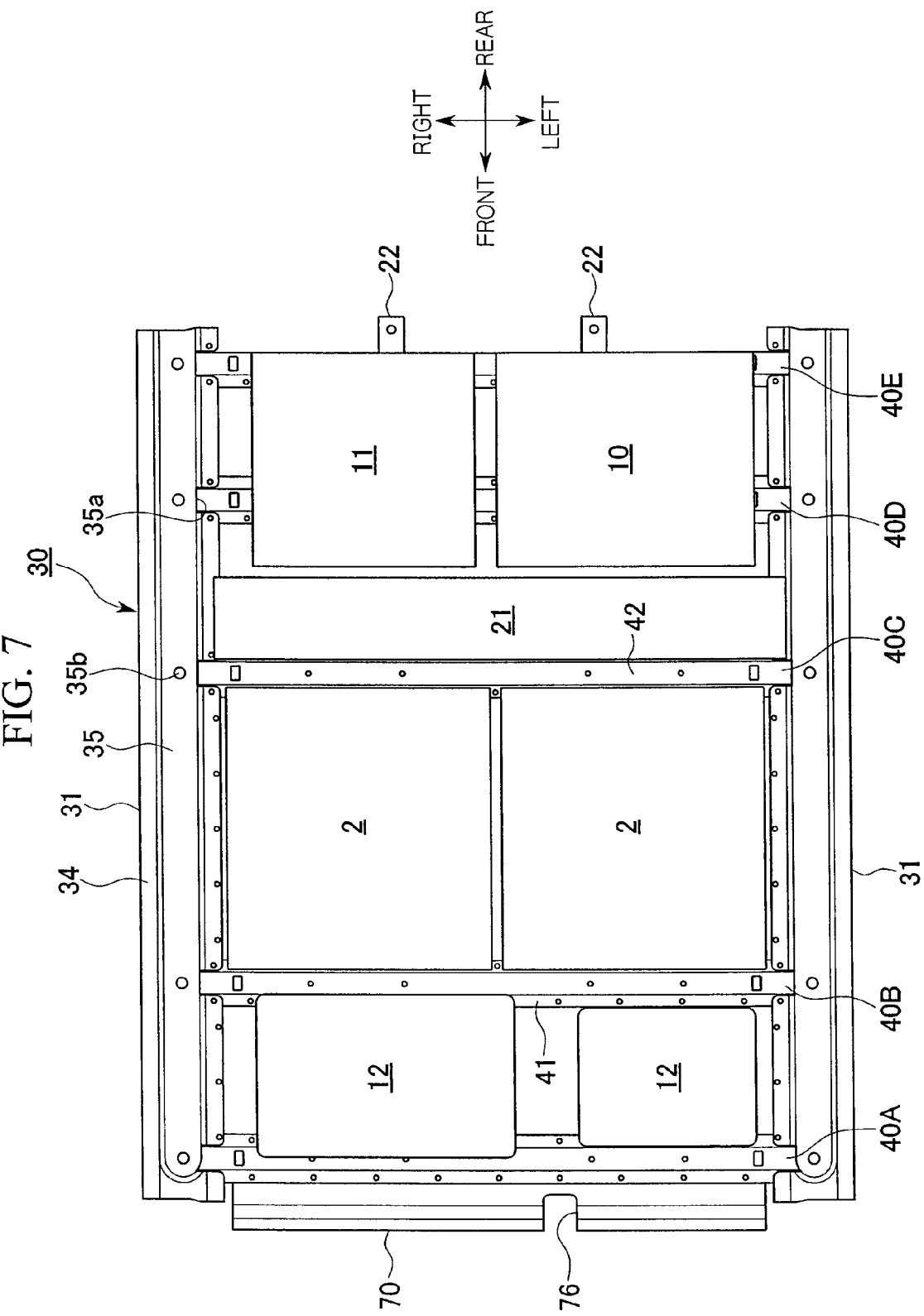
FIG. 7 is a plan view of the fuel cell subframe in the state of components being mounted thereon.

As shown in FIGS. 5 to 7, the fuel cell subframe 30 is mainly constituted by a pair of side frames 31 that extend in the fore-aft direction along both sides of the vehicle body; five cross-members 40A, 40B, 40C, 40D, and 40E that extend in the width direction of the vehicle and link the side frames 31 on both sides (hereinafter generically referred to as cross-members 40 as long as there is no need to distinguish between them); and four bottom plates 60 that are attached to the bottoms of the cross-members 40 so as to close up the gaps between adjacent cross-members 40.

Figure 3:
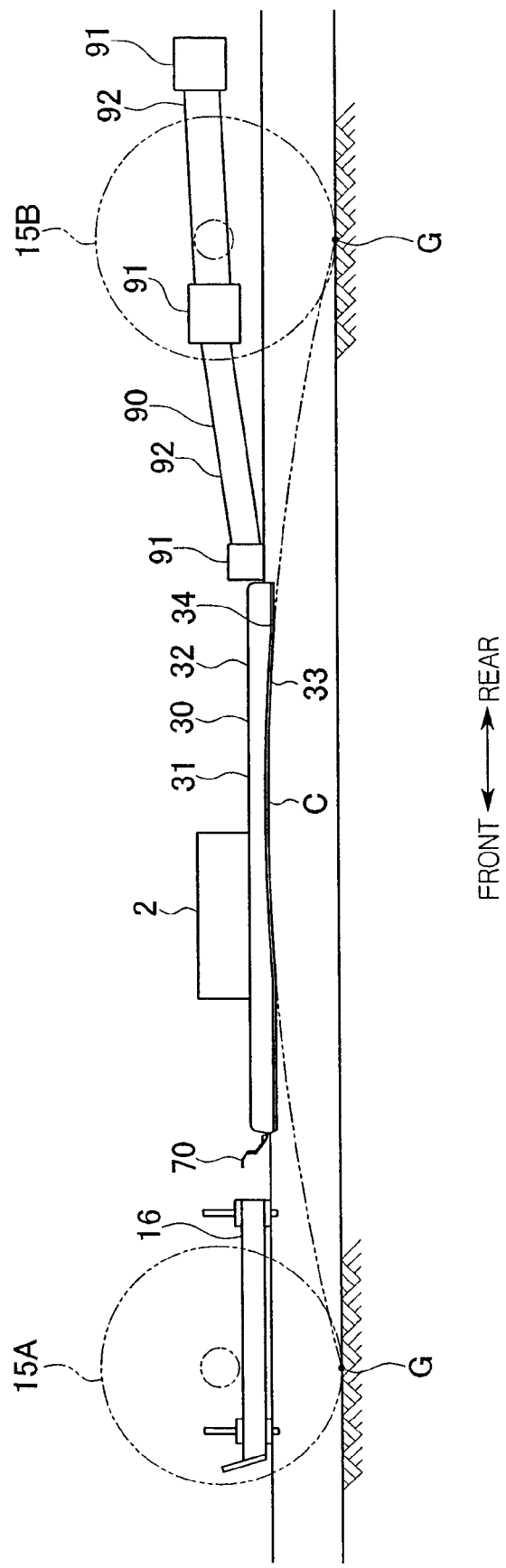
FIG. 3 is layout drawing of each subframe in the fuel cell vehicle.

As shown in FIGS. 3 and 4, the side frame 31 is constituted by an approximately rectangular closed sectional shape by welding an upper side frame 32 and a lower side frame 33 to a flange portion 34. Both of the frames 32 and 33 are formed by press molding or hydroforming aluminum and have a hat-shaped sectional shape. Also, as shown in FIG. 3, the fuel cell subframe 30 is disposed between the front tires 15A and the rear tires 15B, being offset slightly toward the front. The height of the upper surface of each side frame 31 from the tire-ground contact surface G is constant at every position along the fore-aft direction of the vehicle body. However, the lower surface of each side frame 31 curves, with the height from the tire-ground contact surface G being highest at approximately the center portion C between the front tires 15A and the rear tires 15B, and the height of the lower surface of the side frame 31 gradually decreasing toward the front or rear of the vehicle. In this embodiment, the dimension of the lower side frame 33 in the height direction is constant over its entire length in the fore-aft direction of the vehicle body, while the dimension of the upper side frame 32 in the height direction changes along the fore-aft direction of the vehicle body.

Each cross-member 40 is formed by extrusion molding of aluminum in an approximately rectangular closed sectional shape so as to have a flange 41 on the lower portion. Openings 35a are formed on the interior side of a crest portion 35 in each upper side frame 32, with the end portions of each cross-member 40 being inserted from each opening 35a.

The third cross-member 40C from the vehicle body front side is disposed near the center portion C that is the highest location on the lower surface of the pair of side frames 31. The thickness (a dimension of a member in the height direction) of the cross-member 40C is the least among the five cross-members 40A to 40E. The thickness of the cross-member 40A disposed closest to the front of the vehicle body is greater than that of the cross-member 40C. The thickness of the cross-member 40B, which is the second cross-member from the front of the vehicle body, is less than the cross-member 40A but greater than the cross-member 40C. Also, the cross-member 40E, which is disposed closest to the rear of the vehicle body, is thicker than the cross-member 40C, and the cross-member 40D, which is the second cross-member from the rear of the vehicle body, is thinner than the cross-member 40E but thicker than the cross-member 40C.

Figure 8:
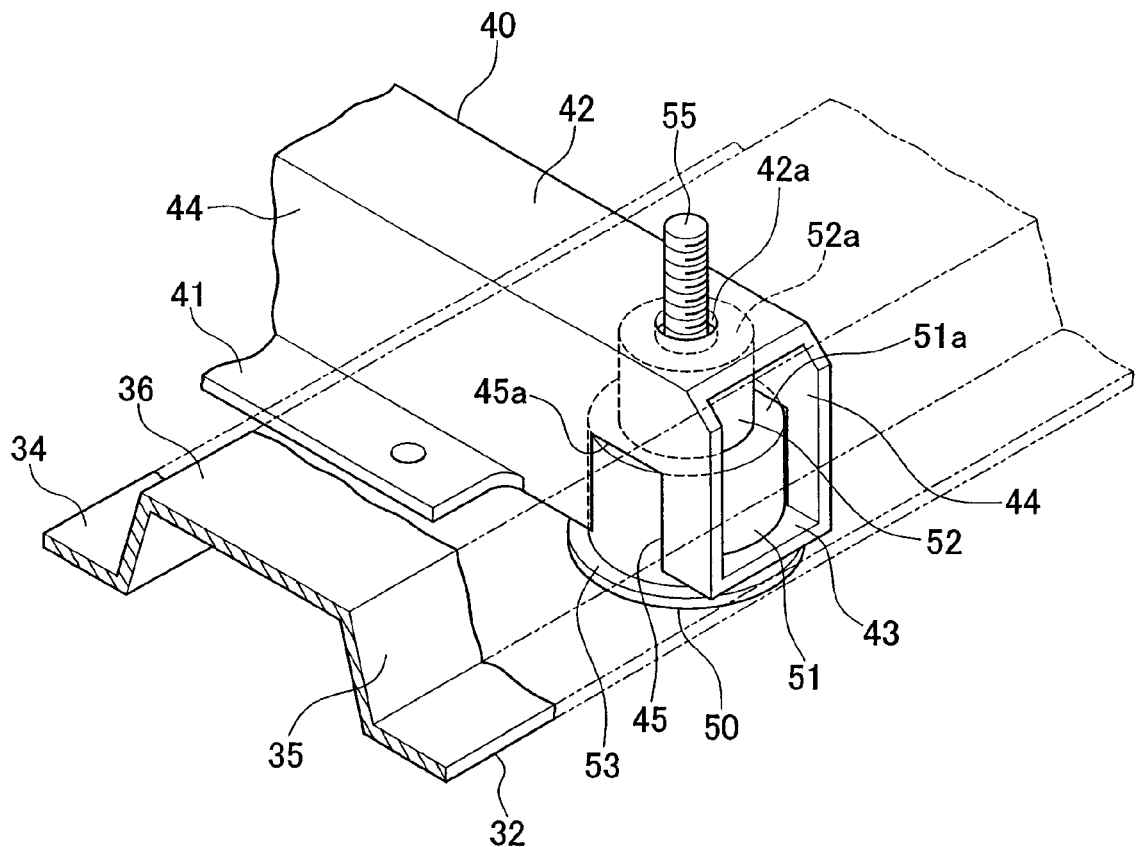
FIG. 8 is a perspective view of the coupling portion between a side frame and a cross-member in the fuel cell subframe.
Figure 9:
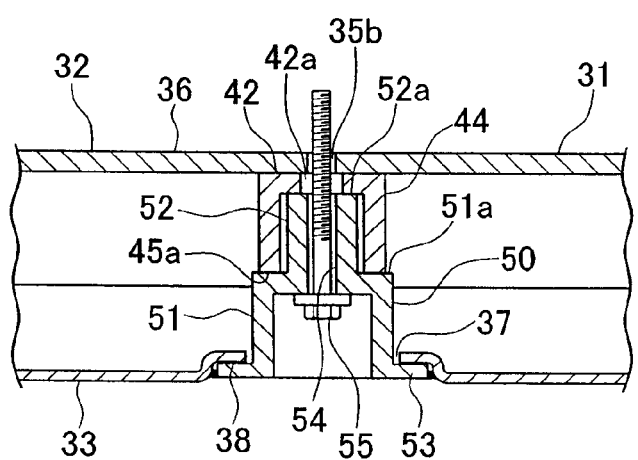
FIG. 9 is a cross-sectional view of the coupling portion.

The end portions of each cross-member 40 are inserted into the side frames 31 from each opening 35a in the upper side frames 32, and fastened to the floor frame 19 together with the side frames 31. Specifically, as shown in FIGS. 8 and 9, in the portion of the end portion of the cross-member 40 that is inserted into the side frame 31, an opening 45 is formed along side walls 44 from a lower wall 43, and a bolt insertion hole 42a is formed in an upper wall 42. Also, in the lower side frame 33, a circular hole 37 is provided at a location corresponding to the opening 45, and a recessed portion 38 that recesses toward the upper side frame 32 is formed along the periphery of the hole 37.

A stepped cylindrical collar 50 is inserted into the hole 37 from the lower side of the frame 33. The collar 50 is made of aluminum and consists of a large diameter cylinder portion 51 having an outer diameter that is larger than the gap between the side walls 44 of the cross-member 40 and a small diameter cylinder portion 52 that can be inserted between the side walls 44, with the large diameter portion 51 and the small diameter portion 52 being arranged consecutively along the same axis. A flange portion 53 is circularly formed along the lower end of the large diameter portion 51, with a through-hole 54 passing through the small diameter portion 52. The large diameter portion 51 and the small diameter portion 52 are inserted into the side frame 31 from the hole 37, and the flange portion 53 abuts the recessed portion 38 and is welded thereto. The large diameter cylinder portion 51 is inserted into the opening 45, and an upper wall 51a of the large diameter portion 51 abuts against an upper edge 45a of the opening 45 in the side walls 44 of the cross-member 40. An upper wall 52a of the small diameter cylinder portion 52 inserted between the side walls 44 is abutted against the inner surface of the upper wall 42 of the cross-member 40. Then a washer-faced bolt 55 is inserted from the lower side of the collar 50 into the through hole 54, the bolt insertion hole 42a in the cross-member 40, and a bolt insertion hole 35b in the upper side frame 32, and moreover inserted into a bolt insertion hole (not illustrated) in the floor frame 19 to be screwed into a nut 56 that is welded to the floor frame 19 (refer to FIG. 4). Thereby, the cross-member 40 is forced upward by the collar 50, and the upper wall 42 abuts against an upper wall 36 of the crest portion 35 of the upper side frame 32.

Each of the bottom plates 60 is riveted to the flange portions 34 of the side frames 31 and the flange portions 41 of the cross-members 40.

In the fuel cell subframe 30 constituted in this way, the upper side frame 32 and the lower side frame 33 are interposed by the collar 50 to grip the end portion of the cross-member 40. The upper side frame 32, the lower side frame 33, and the end portion of the cross-member 40 are then integrally fastened to the floor frame 19 by the common bolt 55.

Figure 10:
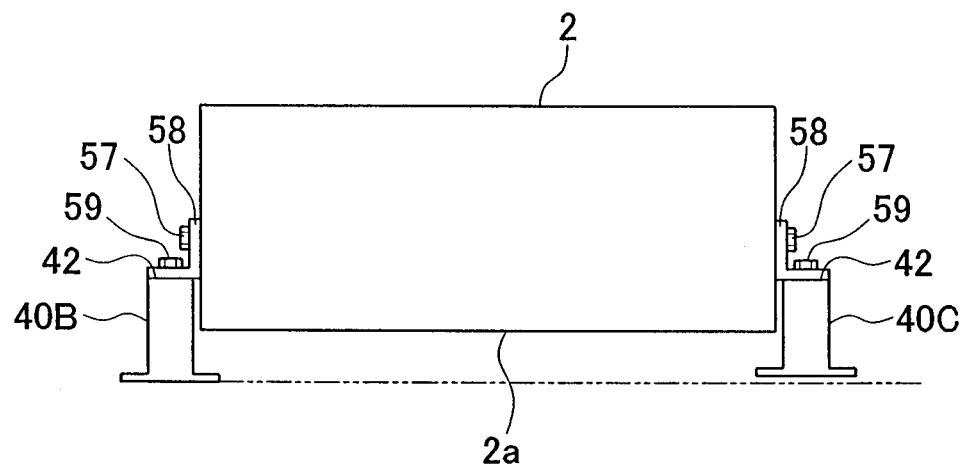
FIG. 10 is a side elevation view showing the mounted state of the fuel cell on the fuel cell subframe.

As shown in FIG. 7, the fuel cells 2 are disposed between the second and third cross-members 40B and 40C from the front of the vehicle body in the fuel cell subframe 30. As shown in FIG. 10, the lower end 2a of each of the fuel cells 2 is positioned between the lower end and the upper end of the cross-members 40B and 40C. A bolt 57 fixes a bracket 58 to each of the front and rear walls of the fuel cells 2, and these brackets 58 are fixed to the upper wall 42 of the cross-members 40B and 40C by a bolt 59, whereby the fuel cells 2 are attached to the fuel cell subframe 30. That is, in the present embodiment, the rear end portions of the fuel cells 2 are fastened to the cross-member 40C disposed near the center between the front tires 1 5A and the rear tires 15B, so that the fuel cells 2 are disposed offset from the center portion toward the front of the vehicle body between the tires 15A and 15B. As shown in FIG. 1, the fuel cells 2 are located under the front seat S.

The resulting structure has the lower portion of the fuel cells 2 embedded in the subframe 30, with the fuel cell subframe 30 and the fuel cells 2 partially overlapping in the height direction. The height as a unit from the lower surface of the subframe 30 to the upper surface of the fuel cells 2 can thus be restricted. As a result, the height of the front floor 17 can be reduced to enable a lowering of the floor of the vehicle.

In addition, since the lower surface of the side frames 31 is curved as described above, when the vehicle drives over a road with an upwardly convex curve, the minimum clearance is ensured between the road surface and the lower surfaces of the side frames 31 at the center portion between the tires 15A and 15B, so that a lowering of the floor of the vehicle is attained.

The high-voltage electrical devices 12 are disposed more toward the front of the vehicle body than the fuel cells 2, being installed between the cross-members 40A and 40B. The air supply-discharge device 10 and the hydrogen circulation device 11 are disposed more toward the rear of the vehicle body than the fuel cells 2, being installed on the cross-members 40D and 40E. The reference number 21 in the drawings denotes piping space provided for the manifold and the like.

Figure 11:
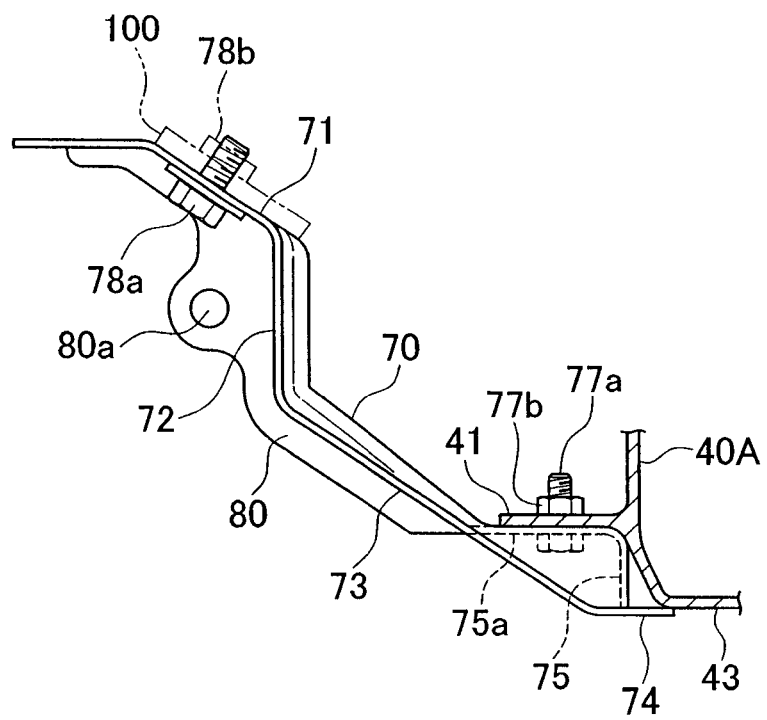
FIG. 11 is a side elevation view of the underguard provided forward of the fuel cell subframe.
Figure 12:
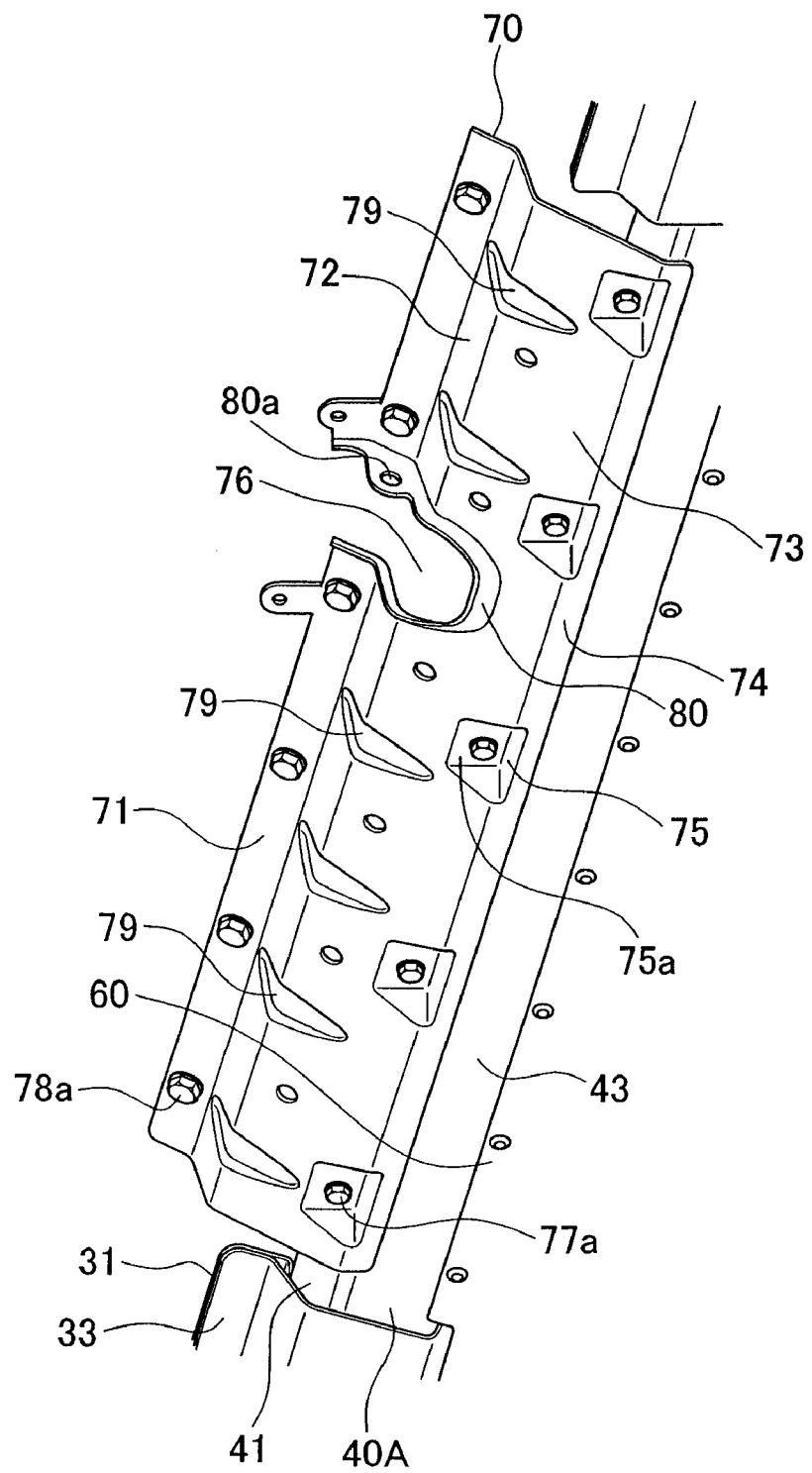
FIG. 12 is a perspective view of the underguard when mounted on the fuel cell subframe, viewed at an angle from below.

Also, as shown in FIG. 3, an underguard 70 is provided immediately in front of the fuel cell subframe 30. FIG. 11 is a side elevation view of the underguard 70, and FIG. 12 is perspective view of the underguard 70 mounted on the subframe 30, viewed at an angle from below.

The underguard 70 is made of aluminum, with the front side disposed higher than the rear end side, being formed in a shape that mainly slopes downward toward the rear of the vehicle body. Specifically, the underguard 70 is constituted by a plate-shaped mounting flange 71 disposed at the front end side and sloping downward toward the rear of the vehicle body; a vertical portion 72 that extends vertically downward from the rear end of the mounting flange 71; an inclined portion 73 continuous with the lower end of the vertical portion 72 and sloping downward toward the rear of the vehicle body; and an overhang portion 74 that extends horizontally from the rear end of the inclined portion 73 toward the rear of the vehicle body. A plurality of ribs 79 for reinforcement is provided at a specified interval in the vehicle width direction at the joint between the vertical portion 72 and the inclined portion 73. Recessed portions 75 each having a horizontal wall portion 75a are provided at a specified interval in the vehicle width direction at the joint between the inclined portion 73 and the overhang portion 74. Also, an opening 76 for allowing insertion of piping such as refrigerant piping that circulates cooling water between the radiator 14 and the fuel cells 2 is formed from the mounting flange 71 to the inclined portion 73. A rib 80 is provided along the entire periphery of the opening 76, and a mounting hole 80a for fixing refrigerant piping and electrical wiring is provided at a specified location in the rib 80.

The horizontal wall portion 75a of each recessed portion 75 is disposed on the lower side of the flange portion 41 of the cross-member 40A and fastened to the flange portion 41 by a bolt 77a and a nut 77b. The overhang portion 74 is thereby made to cover the lower side of the front end portion of the lower wall 43 of the cross-member 40A. Also, the flange portion 71 is fastened to a lower cross (vehicle body frame) 100, which constitutes the frame of the dashboard, by a bolt 78a and a nut 78b. That is, the rear end of the underguard 70 is connected to the cross-member 40A disposed closest to the front side of the vehicle body, and the front end is connected to the vehicle body frame.

By providing the underguard 70 at the front of the fuel cell subframe 30, when an obstruction is present under the vehicle body floor while the vehicle is moving forward, the obstruction can be guided to the underside of the fuel cell subframe 30 by the underguard 70. Equipment such as the high-voltage electrical devices 12 and the fuel cells 2 mounted on the fuel cell subframe 30 can thus be prevented from interfering with the obstruction. Also, since the bolt 77a fixes the horizontal wall portion 75a of the recessed portion 75, which is recessed inward of the inclined portion 73, the head of the bolt 77a does not become a hindrance when the underguard 70 is guiding the obstruction downward. Also, since the underguard 70 is disposed in a confined region forward of the fuel cell subframe 30, the structure is simple and can be made lightweight.

Figure 13:
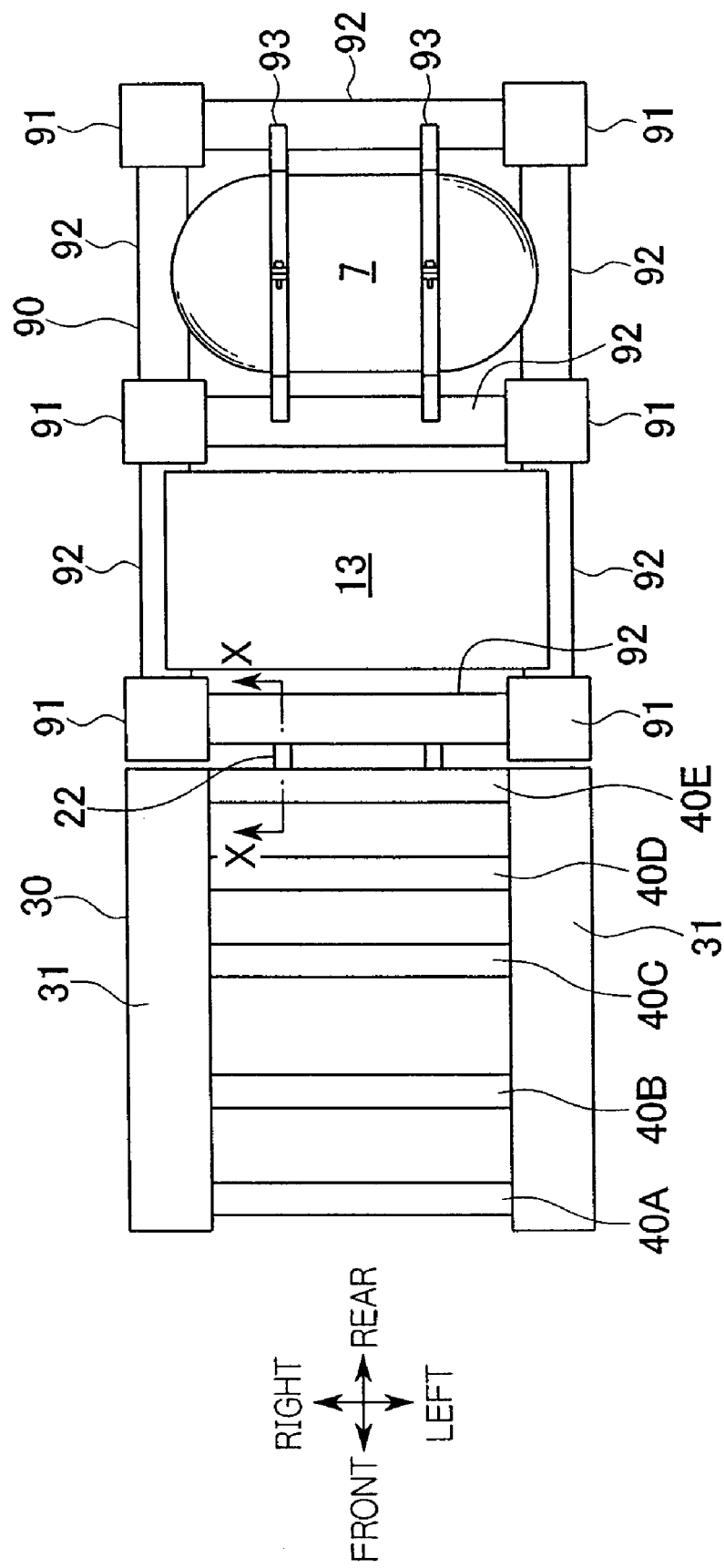
FIG. 13 is a plan view of the coupling portion between the fuel cell subframe and the hydrogen tank subframe.
Figure 14:
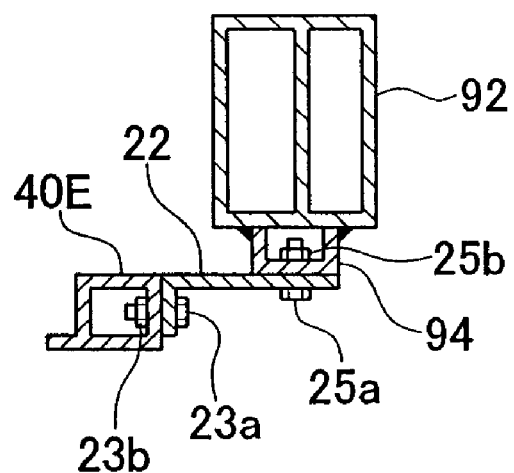
FIG. 14 is a cross-sectional view along line X-X in FIG. 13.

Also, the cross-member 40E, which is disposed in the subframe 30 to be closest to the rear of the vehicle body, is coupled to the hydrogen tank subframe 90 via two coupling arms 22, as shown in FIGS. 13 and 14.

The hydrogen tank subframe 90 is made of aluminum and is mainly constituted by six posts 91 and members 92 that link adjacent posts 91. The posts 91 are fastened by bolts (not illustrated) to the lower walls 19b of the floor frames 19 from the lower side thereof. The capacitor 13 is installed more toward the front of the vehicle body than the member 92 installed in the middle of the hydrogen tank subframe 90, while the hydrogen tank 7 is fixed by bands 93 to the vehicle body rear side of that member 92. The total weight of the equipment (i.e., the hydrogen tank 7 and the capacitor 13) mounted on the hydrogen tank subframe 90 is sufficiently greater than the total weight of the equipment mounted on the fuel cell subframe 30. The hydrogen tank subframe 90 is accordingly designed to have greater mechanical strength than the fuel cell subframe 30. As shown in FIG. 14, the sectional second moment of one of the members 92 which is disposed closest to the front of the vehicle body is therefore made far greater than that of the cross-member 40E.

In the present embodiment, the cross-member 40E is coupled to the member 92 of the hydrogen tank subframe 90 disposed closest to the front of the vehicle body by the coupling arms 22. Specifically, as shown in FIG. 14, the coupling arms 22 are formed in an L-shape, with one end thereof being fixed to the rear wall of the cross-member 40E by a bolt 23a and a nut 23b, with the other end fixed to a seat 94, which is welded to the lower wall of the member 92, by a bolt 25a and a nut 25b. By thus coupling the cross-member 40E of the fuel cell subframe 30 to the member 92 of the hydrogen tank subframe 90, the load to be applied to the cross-member 40E can be reduced. This allows for a strength reduction of the cross-member 40E and a corresponding reduction in weight. A strength reduction and weight saving become possible for the fuel cell subframe 30 as a result. For example, in the present embodiment, though the cross-member 40E was formed with a closed cross-sectional shape similarly to the other cross-members 40A to 40D, the cross-member 40E may also be formed with an open cross-sectional shape.

While the preferred embodiment of the invention has been described and illustrated above, it should be understood that this is exemplary of the invention and not to be considered as limiting. For example, the cross-sectional shape of the side frames and the cross-members for the fuel cell subframe are not limited to those disclosed in the embodiment. Also, the number of the cross-members is not limited to the five in the embodiment.

Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell vehicle comprising:
    a vehicle body having a floor frame;
    front wheels;
    rear wheels;
    a fuel cell that generates electricity by the electrochemical reaction of hydrogen and oxygen; and
    a subframe on which the fuel cell is mounted, being attached to the lower side of the floor frame and has a pair of side frames that extend in the fore-aft direction of the vehicle body;
    wherein the lower end of each side frame is formed to have a recess portion so that the portion located substantially midway between the front wheels and the rear wheels is the highest point from the tire-ground contact surface.

2. A fuel cell vehicle according to claim 1, further comprising a plurality of cross-members that extend in the width direction of the vehicle body to couple the side frames,
    wherein each of the side frames has an upper side frame and a lower side frame, with the upper side frame and the lower side frame sandwiching and fixing the end portions of the cross-members.

3. A fuel cell vehicle according to claim 2, wherein the upper side frames, the lower side frames, and the end portions of the cross-members are fastened to the floor frame by a common bolt.

4. A fuel cell vehicle according to claim 1, further comprising:
    a plurality of cross-members that extend in the width direction of the vehicle body to couple the side frames; and
    an underguard that is provided in front of the subframe and has a shape that slopes downward toward the rear of the vehicle body, wherein the vehicle body has a vehicle-body frame that extends in the width direction, and wherein the front edge of the underguard is coupled to the vehicle-body frame, and the rear edge of the underguard is coupled to the cross-member disposed closest to the front of the vehicle body.

5. A fuel cell vehicle according to claim 1, further comprising:

a second subframe attached to the lower side of the floor frame, separate from the subframe in the fore-aft direction of the vehicle body; and a coupling member that couples mutually approaching portions of the subframe and the second subframe.

6. A fuel cell vehicle according to claim 5, further comprising a hydrogen tank which stores pressurized hydrogen to be supplied to the fuel cell, being mounted on the second subframe.

7. A fuel cell vehicle according to claim 5, further comprising a motor which drives at least one of the front wheels and rear wheels, being mounted on the second subframe.

8. A fuel cell vehicle according to claim 5, further comprising a plurality of cross-members that extend in the width direction of the vehicle to couple the side frames, wherein the coupling member is coupled to one of the cross-members disposed at a position closest to the second subframe.

* * * * *